US000001419H

United States Statutory Invention Registration [19]

[11] Reg. Number: H1419

Wilpers et al.

[43] Published: Feb. 7, 1995

[54] FUNCTIONALIZED MODIFIED HIGH MELT FLOW POLYOLEFINS

[75] Inventors: Dale J. Wilpers, Houston; Charles C. Hwo, Sugar Land; Robert W. Lee; William H. Korcz, both of Houston, all of Tex.; Simon Mostert, Santa Fe, N. Mex.

[73] Assignee: Shell Oil Company, Houston, Tex.

[21] Appl. No.: 961,966

[22] Filed: Oct. 16, 1992

[51] Int. Cl.[6] ..... C08L 23/00
[52] U.S. Cl. ..... 525/240
[58] Field of Search ..... 524/517, 522, 523; 525/70, 28, 190, 193, 240, 327.4

[56] References Cited

U.S. PATENT DOCUMENTS

| | | | |
|---|---|---|---|
| 3,862,265 | 1/1975 | Steinkamp et al. | 525/305 |
| 3,886,227 | 5/1975 | VanBrederode et al. | 525/309 |
| 4,161,452 | 7/1979 | Stambaugh et al. | 525/285 |
| 4,409,345 | 10/1983 | Moteki et al. | 525/71 |
| 4,595,726 | 6/1986 | Klosiewicz | 525/71 |
| 4,957,974 | 9/1990 | Ilenda et al. | 525/67 |
| 4,960,820 | 10/1990 | Hwo . | |

*Primary Examiner*—Robert L. Stoll
*Assistant Examiner*—Joseph D. Anthony

[57] ABSTRACT

It is herein provided a polymer composition having and exhibiting improved bonding to incompatible materials comprising functionalized high melt flow polyolefins and unfunctionalized polyolefins. More specifically, these compositions have and exhibit improved adhesion to polar materials, and improved dyeability and printability.

9 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FUNCTIONALIZED MODIFIED HIGH MELT FLOW POLYOLEFINS

FIELD OF THE INVENTION

This invention generally relates to polyolefins. More particularly, this invention relates to high melt flow polyolefins modified by functionalization, which are then blended with unmodified normal melt flow polyolefins to form unique polymers blends. These blends have among other advantages, improved dyeability, printability, and adhesion to polar materials.

BACKGROUND OF THE INVENTION

Polyolefins including polypropylene and polybutylene are very well known in the art. Methods of manufacturing and/or processing polyolefins are also known. For example, it is known that due to the rheological incompatibility between soupy polybutylene and regular melt flow polyolefins, the high melt flow polybutylene tends to flow to the outer layer of the molten polymer pool in the extruder. This phenomenon causes the finished parts to be polybutylene rich on the surface. Functionalization of the high melt flow polybutylene is likewise expected to increase the availability of functional groups on the surface of the finished parts.

Functionalization of polymers is known in the art. Functionalization can be accomplished by methods inclusive of electron discharge (Corona discharge) or flaming (oxidization). In multilayer film or sheet structure of two incompatible materials, these methods or a tie layer adhesive is employed to achieve bonding. An undesired drawback of the current practice is that it requires additional equipment, resulting in additional costs. Thus, a simpler and less expensive method of bonding incompatible polymeric materials together or to other materials would be beneficial.

SUMMARY OF THE INVENTION

It is an object of this invention to provide polymeric compositions having and exhibiting improved bonding to other incompatible polymeric materials, particularly to polar materials.

It is a further object of this invention to provide a simple and economical method of bonding incompatible polymeric materials.

In accordance with this invention, it is now provided a polymer composition comprising functionalized high melt flow polyolefin and unfunctionalized polyolefin.

The inventive composition has and exhibits improved dyeability and printability, and improved adhesion to polar materials. Functionalization is accomplished by reacting with a carboxylic acid anhydride, which can be exemplified by maleic anhydride.

DETAILED DESCRIPTION OF THE INVENTION

Very broadly speaking, the practice of this invention involves blending modified high melt polyolefins with unmodified polyolefins to form a blend having certain unique characteristics. The term (un)modified as used herein is interchangeable with the term (non)functionalized. The materials useful in the practice of this invention include polyolefins, and suitable functional groups containing compounds. In these modified compounds, the polymers are chemically modified through chemical reaction such as copolymerization or grafting through an extruder or a reactor.

All polyolefin polymers which are capable of being blended are suitable in the practice of this invention. The polymers include polyethylene, polybutene-1 (polybutylene), polybutene, polyketones, polyisoprene, and polymethylpentene and their copolymers. Polypropylene and polybutylene homo- and copolymers are the preferred polyolefin polymers.

The useful polybutene-1 homo- or copolymer can be isotactic, elastomeric, syndiotactic, or it can have any characteristic that is known or expected of polybutene-1. These polybutene-1 polymers have a melt flow measured by ASTM D1238 Condition "L" at 230° C. in the range of from about 20 to 1500, with a preferred range of from about 50 to 1000, and a particularly preferred range of from 100 to 750 g/10 min. These polybutene-1 polymers including their methods of preparation, and their properties are known in the art. An exemplary reference containing additional information on polybutylene is U.S. Pat. No. 4,960,820 which is herein incorporated by reference.

The particularly preferred polybutene-1 polymer has a melt flow of 490 g/10 min. at 230° C. and a molecular weight of 108,000.

The polypropylene used in the present invention is any crystallizable polypropylene. The polypropylene can be prepared by homopolymerizing propylene irrespective of the method used so long as a crystallizable polypropylene is formed. The preferred polypropylenes are the substantially isotactic polypropylenes prepared by the Ziegler/Natta or $MgCl_2$-supported catalyst polymerization process.

The propylene polymers usable herein can be either propylene homopolymers or copolymers. If propylene copolymers are used, they can be random or block copolymers with the comonomer content preferably 1–30 mole % of either ethylene, butene, or an alpha olefin having from 5 to 8 carbon atoms.

Propylene polymers useful in the invention preferably have a melt flow of less than 30.0, more preferably from about 1.0 to 10.0 g/10 min., as measured by ASTM D-1238, Condition L at 230° C. A particularly suitable polypropylene, has a melt flow of 2.8 g/10 min. and is available from Shell Chemical Company, of Houston, Tex. as PP5A08.

The terms suitable functional group(s) containing compounds refers to compounds wherein the functional group is polar. Such compounds include but are not limited to anhydrides, carboxylates and acrylates. The preferred compound is maleic anhydride.

The functionalized polymer of this invention has numerous uses. For example, it is useful in producing articles of manufacture such as films, molded parts such as cups, trays, and containers, and textiles. The functionalized polymer is expected to show improved adhesion, especially to polar substrates, such as EVOH copolymers, EVA copolymers, aluminum, polyamides, polyesters, polyacrylates and ionomers.

The invention can be further illustrated by the following prophetical example.

EXAMPLE 1

An unmodified polypropylene with melt flow of 2.8 can be dry-blended or melt-compounded with modified high melt flow (MF=490) polybutylene. The blended product can then be made into sheets of 20 mils in thickness either by an extruder coupled with a sheet casting die or a hot platen press. The said sheet can then be stretched using a film stretcher such as the one made by the T. M. Long Company. The stretching can be done simultaneously or sequentially at 4.4 stretch ratio in both machine and transverse directions. The drawing conditions, for example, can be:

Drawing Temperature—150° C.

Drawing Speed—30 mm/sec.

Preheat Time—3 min.

Grip Force—125 psi

The resulting films of about 1 mil in thickness can be compared with materials of the 100% unmodified polypropylene. The film made of unmodified polypropylene plus 5 weight percent high melt modified polybutylene can have better dyeability, printability, and adhesion to polar materials than the film made of 100% unmodified polypropylene.

While this invention has been described in detail for the purpose of illustration, it is not to be construed as limited thereby but is intended to cover all changes and modifications within the spirit and scope thereof.

That which is claimed is:

1. A polymer composition having and exhibiting improved bonding and printability comprising functionalized polybutylene having a melt flow of up to 1500 g/min., and unfunctionalized polypropylene.

2. A composition as in claim 1 having and exhibiting improved adhesion to polar materials.

3. A polymer composition having and exhibiting improved bonding and printability comprising functionalized polyolefins having a melt flow of up to 1500 g/min., and unfunctionalized polyolefins.

4. A composition as in claim 3 having and exhibiting improved adhesion to polar materials.

5. A composition as in claim 3 wherein said functionalization is accomplished by means of one or more members selected from the group consisting of anhydrides, carboxylates and acrylates.

6. A composition as in claim 5 wherein said group member is maleic anhydride.

7. A composition as in claim 1 wherein said functionalization is accomplished by means of one or more members selected from the group consisting of anhydrides, carboxylates and acrylates.

8. A composition as in claim 7 wherein said group member is maleic anhydride.

9. An article of manufacture made from the composition of claim 3.

* * * * *